Nov. 14, 1967  DE LANE D. PATTON  3,352,583
JOINT FOR STEERING LINKAGE AND THE LIKE
Filed June 24, 1965  2 Sheets-Sheet 1
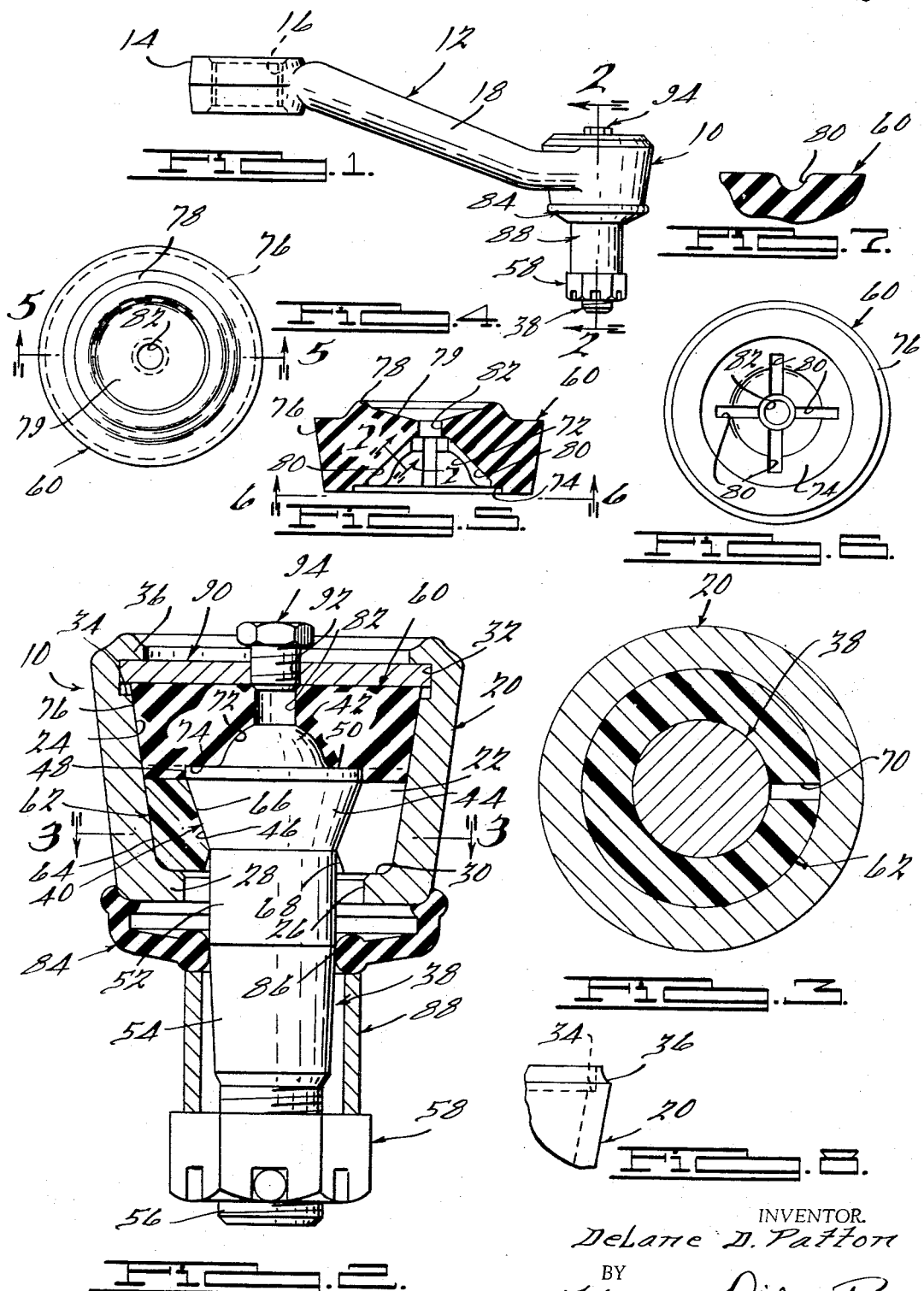
INVENTOR.
DeLane D. Patton
BY
Harness, Dickey & Pierce
ATTORNEYS.

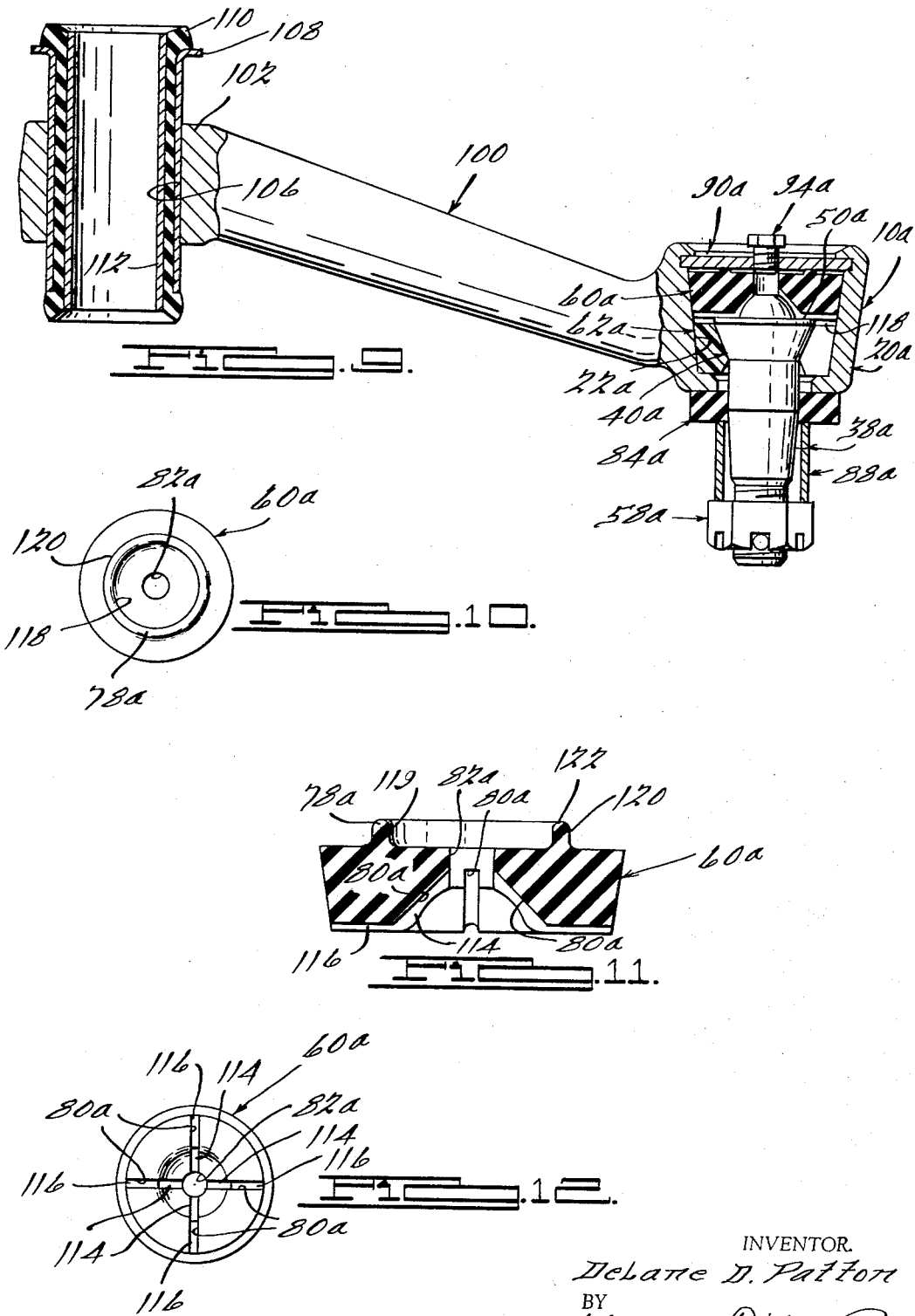

United States Patent Office 3,352,583
Patented Nov. 14, 1967

3,352,583
JOINT FOR STEERING LINKAGE
AND THE LIKE
De Lane D. Patton, Worthington, Ohio, assignor to Columbus Auto Parts Company, Columbus, Ohio, a corporation of Ohio
Filed June 24, 1965, Ser. No. 466,770
13 Claims. (Cl. 287—93)

ABSTRACT OF THE DISCLOSURE

The invention relates to a flexible joint wherein a stud member is seated in a housing between a pair of flexible bearing seats, one of which engages a frusto-conical and hemispherical portion of the stud and is formed with a preloading ramp in alignment with a radial shoulder defined between said frusto-conical and hemispherical portions.

---

This invention relates generally to flexible joints and, more particularly, to a new and improved pitman or idler arm construction for use in automotive vehicle steering linkages and the like.

It has heretofore been the practice in automotive vehicle and similar type steering assemblies to provide means in the form of a pair of transversely spaced arms for movably supporting the center or cross bar of the steering linkage. Such arms are commonly known as pitman and idler arms and it is very desirable that such arms provide for essentially single plane motion of the center linkage to accommodate for lateral or transverse movement thereof. It is also desirable that such support arms are slightly flexible or deformable to allow for slight misalignment of the various component members of the steering linkage upon assembly thereof; however, the arms should also be sufficiently rigid so as to be capable of resisting vertical shock loads and of absorbing various road vibrations to minimize the transfer of irregular or bumpy road surface conditions through the steering assembly to the vehicle steering wheel, thereby minimizing driver fatigue and, more importantly, attrition and excess wear of the various component members of the steering linkage.

It is accordingly a general object of the present invention to provide a new and improved pitman or idler arm construction which functions in the above manner.

It is a more particular object of the present invention to provide a new and improved flexible joint construction for a pitman or idler steering arm of the above character.

It is still a more particular object of the present invention to provide a new and improved flexible joint construction of the above character that includes a socket portion adapted to receive and movably support for limited angular and rotative movement, one end of a stud member that is secured to the steering linkage.

It is another object of the present invention to provide a new and improved flexible joint construction of the above character wherein the head portion of the stud member is compressed within the socket portion between a pair of deformable seat members.

It is another object of the present invention to provide a new and improved joint construction of the above character wherein one of the seat members is preloaded within the socket portion to provide for wear take-up after extended operational use of the joint.

It is still another object of the present invention to provide a new and improved joint construction of the above character wherein the seat member that is preloaded is formed with a preloading ramp portion which, upon assembly thereof, is compressed in a manner so as to exert a predetermined force upon the head portion of the stud member to limit the angular and rotative movement thereof.

It is a further object of the present invention to provide a new and improved flexible joint construction of the above character with improved dynamic load-carrying ability.

It is another object of the present invention to provide a novel method for assembling a flexible joint construction wherein substantially uniform torque transmitting and vibration damping characteristics are maintained throughout the operational life thereof.

It is still another object of the present invention to provide a new and improved joint construction of the above character wherein the seat members are constructed of Delrin, urethane or similar abrasion-resistant, long wearing bearing materials.

It is yet another object of the present invention to provide a new and improved flexible joint construction of an extremely simple design which is easy to assemble and economical to commercially produce.

Other objects and advantages of the present invention are achieved through the provision of a novel flexible joint construction that comprises a housing portion which defines a central cavity or socket and is adapted to be integrally formed on one end of a pitman or idler arm of the type commonly found in an automotive steering linkages and the like. The central cavity is adapted to receive one end of a headed stud member, a pair of bearing or seat members being disposed within the cavity and adapted to support the stud member for limited angular and rotative movement relative to the arm. In accordance with the principles of the present invention, the seat members are formed in a manner such that relatively uniform torque transmitting and vibration absorbing or damping characteristics are maintained throughout the operational life of the arm, even though the seat members become slightly worn after extended use, thereby prolonging the operational life of the arm and consequently reducing vehicle maintenance time and expense to a minimum.

A more complete understanding of the present invention and other features and advantages thereof will become apparent from the following detailed description taken in conjunction with the accompanying drawings, wherein:

FIGURE 1 is a side elevational view of a pitman steering arm construction embodying the principles of the flexible joint construction of the present invention;

FIGURE 2 is an enlarged longitudinal cross-sectional view taken along the line 2—2 of FIGURE 1;

FIGURE 3 is a transverse cross-sectional view taken along the line 3—3 of FIGURE 2;

FIGURE 4 is a top elevational view of one of the bearing or seat members incorporated in the flexible joint construction illustrated in FIGURE 2;

FIGURE 5 is a transverse cross-sectional view taken along the line 5—5 of FIGURE 4;

FIGURE 6 is a bottom elevational view of the seat member illustrated in FIGURE 5, as seen along the line 6—6 thereof;

FIGURE 7 is a fragmentary cross-sectional view taken along the line 7—7 of FIGURE 5;

FIGURE 8 is an enlarged fragmentary view of a portion of the housing illustrated in FIGURE 2, prior to final assembly of the joint construction of the present invention;

FIGURE 9 is a side elevational view, partially broken away, of an idler arm embodying an alternate embodiment of the joint construction of the present invention;

FIGURE 10 is a top elevational view of one of the seat members incorporated in the joint construction shown in FIGURE 9;

FIGURE 11 is an enlarged transverse cross-sectional view of the seat member illustrated in FIGURE 10; and FIGURE 12 is a bottom elevational view of the seat member illustrated in FIGURE 10.

Referring now to FIGURE 1 of the drawing, a flexible joint construction 10, in accordance with a preferred embodiment of the present invention, is shown as being mounted on one end of a pitman-type steering arm, generally designated 12, of the type commonly found in automotive vehicle and similar type steering linkages. Together with the joint construction 10, the arm 12 comprises an annular sleeve or collar section 14 which defines a central opening 16 that is adapted to receive the rock shaft or the like (not shown) of an associated steering gear assembly (not shown). The arm 12 also comprises an inclined bar or link section 18 which interconnects and is integrally secured at its opposite ends to the joint construction 10 and collar section 14.

Referring now in detail to the joint construction 10 of the present invention, as best seen in FIGURE 2, the joint 10 comprises an external housing 20 which is preferably constructed of forged steel and is formed integrally on one end of the link section 18 of the arm 12, as above described. The housing 10 is formed with a central cavity 22 which defines a tapered or frusto-conical side wall 24. The cavity 22 is provided at its lower end with an aperture or opening 26 that is coaxially aligned with the cavity 22 and is surrounded by a flange portion 28 forming an annular shoulder 30 which is exposed to and comprises the lower end of the cavity 22. As initially formed, the opposite (upper) end of the cavity 22 is open and is formed with an annular groove or recess 32 which also defines an annular shoulder 34, the portion of the housing 20 circumjacent the recess 32 being formed with a reduced thickness portion 36, as illustrated in FIGURE 8, which is adapted to be peened or crimped radially inwardly to retain the various component members within the cavity 22, as will later be described.

The joint construction 10 is adapted to be operatively connected to the transversely extending center or cross link member (not shown) of an automotive vehicle steering linkage or the like by means of an elongated cylindrical stud member, generally designated by the numeral 38. As best seen in FIGURE 2, the upper end of the stud member 38 is formed with a head section 40 which comprises a hemispherical upper portion 42 that terminates at its lower end in a tapered portion 44 which defines a frusto-conical surface 46 and an annular or cylindrical surface 48. In a preferred construction of the present invention, the surface portion 48 is inclined at an angle of between 15 and 30 degrees from the longitudinal axis of the stud member 38. The head portions 42 and 44 define a flat radially outwardly extending bearing surface 50 at the juncture thereof. The lower end of the tapered portion 44 terminates at the cylindrical medial section 52 which, upon assembly of the stud member 38 within the housing 20, is axially aligned with the flange portion 28 formed at the lower end of the housing 20. It will be seen that the diameter of the opening 26 is somewhat larger than the cylindrical section 52 to permit a limited amount of angular movement of the stud member 38 relative to the housing 20. The lower end of the stud member 38 is formed with a slightly tapered section 54 that terminates in an externally threaded end portion 56 which is adapted to receive a suitable nut 58 for securing the stud member 38 and hence the joint construction 10 to the aforementioned cross link member of an automotive vehicle steering linkage or the like.

The head section 40 of the stud member 38 is retained and movably supported within the cavity 22 of the housing 20 by means of upper and lower bearing or seat members 60 and 62, the latter of which is preferably constructed of a synthetic polymer bearing material distributed under the name of Delrin, although any other suitable abrasive resistant, low friction material such as nylon or the like may be used satisfactorily. The seat member 62 is adapted to be supported at its lower end upon the annular shoulder 30 and is formed with a frusto-conical external surface 64 which contiguously engages the side wall 24 of the cavity 22. The seat member 62 is also formed with a frusto-conical interior surface 66 complementary to and adapted to contiguously engage the frusto-conical surface 46 of the stud member 38. In a preferred construction of the seat member 62, the angle of the surface 66 with respect to the axis of the stud member 38 is slightly less than the angle of the surface portion 46 of the stud member 38 so that initial contact between these members will be at the top of the seat member 62. Accordingly, as the stud member 38 is "loaded" into the seat member 62, the surface portion 46 is forced into a greater amount of bearing contact with the surface portion 66 due to slight plastic deformation of the seat member member 62. This construction allows for considerable variation in the size of the surface portion 66, thus minimizing the necessity for precision machining. The lower end of the seat member 62 is cut away, as seen at 68 in FIGURE 2, preferably in the form of a frustum cone so that there is no interference between the cylindrical medial section 52 and the seat member 62 upon limited angular movement of the stud member 38 relative to the housing 20.

The seat member 62 is formed with a radially extending slit or slot 70 which is substantially closed when the member 62 is disposed within the cavity 22, as best seen in FIGURE 3. The slit 70 permits the seat member 62 to adjust to any slight dimensional irregularities in the size of the cavity 22 due to production variations in the manufacture of the housing 20. It will be seen that the seat member 62, with the exception of the slit 70, entirely fills the lower end of the cavity 22 and thus prevents any free movement of the head section 40 of the stud member 38 within the cavity 22 of the housing 20.

Referring now to FIGURES 5 and 6, the bottom or lower end of the upper seat member 60 is formed with hemispherical and cylindrical shaped recessed portions 72 and 74 which are complementary to and are adapted to contiguously engage the upper portion 42 and cylindrical surface 48, respectively, of the stud member 38. The upper seat member 60 is also formed with a frusto-conical exterior surface 76 which is adapted to contiguously engage the side wall 24 of the cavity 22 upon assembly of the seat member 60 therewithin. As best seen in FIGURE 5, the top of the seat member 60 is formed with an upwardly projecting annular ramp or embossment 78 that defines a relatively shallow concave recess 79 and is adapted to function in a manner later to be described. It will be seen that the lower end of the upper seat member 60 bears upon the top of the lower seat member 62 and upon the shoulder 50 of the stud member 38. Also, it will be seen that the seat member 60 entirely fills the upper end of the cavity 22 and thus cooperates with the lower seat member 62 in limiting any free movement of the stud member 38 relative to the housing 20. The seat member 60 is preferably constructed of a synthetic rubber material such as urethane or equivalent shock and vibration absorbing or damping material which has a durometer rating of approximately 50 Shore D.

As best seen in FIGURES 5, 6 and 7, the hemispherical recessed portion 72 of the seat member 60 is formed with four equally circumferentially spaced, radially outwardly extending semi-circular shaped grooves, generally designated 80, that are adapted to communicate or distribute a suitable lubricant from a central bore 82, which extends axially between the recessed portions 72 and 79, to the mutually confronting surfaces of the hemispherical stud portion 42 and the recessed portion 72. If desired, the lower seat member 62 may also be formed with suitable lubricant containing grooves, although such construction is optional and is not considered necessary by virtue of the fact that the slit 70 is adapted to contain an appreciable amount of lubricant within the cavity 22. Upon assembly of the joint construction 10, as will hereinafter be described, the grooves 80 and slit 70 will be filled or "packed" with a suitable lubricant and the cavity 22 will therafter be sealed to the atmosphere, whereby the joint construction 10 will have a relatively long and effective operational life without requiring frequent lubrication thereof. It may be noted that the grooves 80, along with providing a lubricant retaining reservoir within the cavity 22, provide space for portions of the seat member 60 to deform or "flow" to enhance the impact or shock absorbing characteristics of the joint construction 10.

The lower end of the housing 20 is covered by an annular cup-shaped dust shield, generally designated 84 that is adapted to prevent moisture, road dirt and the like from entering into the cavity 22 through the annulus defined between the stud member 38 and the opening 26. The dust shield 84 defines a central opening 86 which is in peripheral engagement with the stud member 38, the shield being maintained in a position tightly engaging the lower end of the housing 20 by means of a cylindrical ferrule member 88 that extends around and longitudinally of the stud member 38 and is supported thereon by the aforedescribed nut 58.

Upon assembly of the joint construction 10, the lower seat member 62 is initially placed within the cavity 22 through the open upper end of the housing 20. The lower end of the stud member 38 is thereafter inserted through the open upper end of the housing 20 until the frustoconical surface 46 of the stud member 38 bears upon the associated surface 66 of the seat member 62, as illustrated in FIGURE 2. The upper seat member 60 is then inserted into the cavity 22 until the lower end of the member 60 bears upon the top of the lower seat member 62, as also illustrated in FIGURE 2. An annular sealing washer or closure member 90 which is slightly smaller in diameter than the recessed groove portion 32 formed in the housing member 20 is then inserted into the top of the cavity 22 and is thereafter forced downwardly until the lower edge thereof engages the shoulder portion 34. It will be seen that as the closure member 90 is forced downwardly within the cavity 22, the ramp 78 on the seat member 60 will be deformed or compressed to the position illustrated in FIGURE 2. After the closure member 90 has been forced downwardly, the reduced thickness portion 36 formed around the top of the housing 20 may be peened or crimped downwardly and radially inwardly from the position illustrated in FIGURE 8 to the position illustrated in FIGURE 2. Such a peening or crimping operation may be easily performed on a suitable metal "spinning" apparatus of the type well known in the metal forming art. The amount of crimping that the section 36 is subjected to will determine the ultimate axial position which the closure member 90 will assume upon final assembly of the joint construction 10, the section 36 being illustrated in FIGURE 2 as only partially crimped, whereby the resilient upper seat member 60 will bias the closure member 60 will bias the closure member 90 slightly upwardly away from the shoulder 34 and into engagement with the peened or crimped section 36. The position of the closure member 90 in turn determines the amount or degree of compression of the ramp portion 78 of the upper seat member 60, as will hereinafter be described. After assembly of the closure member 90, the dust cover 84 and ferrule 88 may be assembled onto the lower end of the stud member 38 and be secured thereon by the stud member 58.

In the construction of the present invention illustrated herein, the closure member 90 is formed with a central bore 92 which is coaxially aligned with the bore 82 in the upper seat member 60, the bore 92 being closed by a suitable grease plug 94 which may be removed to facilitate replenishing lubricant within the cavity 22.

As hereinabove described, upon assembly of the joint construction 10, the ramp portion 78 of the upper seat member 60 is compressed by the closure member 90, whereby the portions of the seat member 60 below the ramp 78 will exert a predetermined force upon the outer periphery of the hemispherical portion 42 and shoulder 50 of the stud member 38, which force is adapted to limit any relative angular movement or deflection of the stud member 38 within the housing 20 to a predetermined amount. Preferably, the upper seat member 62 exerts a compressive force against the head section 40 of the stud member 38 of between 800 lbs. to 1300 lbs. It may be noted that the amount of force and distribution thereof exerted on the stud member 38 is controlled by the particular configuration of the ramp portion 78, the instant embodiment of the seat member 60 being shown with the afore-described recess portion 80 which is defined by a gradual inwardly and downwardly inclined or slope that is defined by the radially inner surface of the ramp portion 78. In this embodiment, therefore, a substantial amount of force will be exerted upon the shoulder 50 of the stud member 38 and a somewhat less amount of force will be exerted upon the surface of the hemispherical portion 42 thereof.

A particular feature of the present invention resides in the fact that the ramp portion 78 will exert a substantially uniform force upon the upper end of the stud member 38 throughout the operational life of the joint construction 10, even though there may be some slight abrasional or frictional deterioration of the recessed portion 72 of the seat member 60, the reason for this being that the portion of the seat member 60 which is compressed due to the ramp 78 will "take-up" or fill any worn portions of the recess 72 incurred during extended use of the joint construction 10.

Referring now to FIGURES 9 throughout 12, a slightly modified embodiment of the joint construction of the present invention is generally designated by the numeral 10a and is shown in operative association with an idler-type steering arm 100 of a type commonly found in automotive vehicle and similar type steering linkages. The arm 100 comprises a collar section 102 that defines a bore 106 within which a plurality of sleeve bushings 108, 110 and 112 are concentrically oriented, which bushings are adapted to receive a suitable pivot shaft or the like (not shown) for securing one end of the idler arm 100 to the chassis of an automotive vehicle or the like. The joint construction 10a is shown as comprising a housing 20a that defines a frusto-conical shaped central cavity 22a, a stud member 38a, ferrule member 88a, nut 58a, annular closure member 90a and grease plug 94a, all of which members correspond to the analogous parts designated by like numerals in the aforedescribed joint construction 10. Also, these members are identical in function and construction to the joint 10, with the exception that the stud member's head section 40a is retained and movably supported within the cavity 22a by means of a pair of upper and lower bearing seat members 60a and 62a, the former of which differs slightly in construction from its analogous component of the joint construction 10, as will hereinafter be described.

As best seen in FIGURES 11 and 12, the upper seat member 60a of the joint construction 10a is formed with four radially outwardly extending lubricant grooves, generally designated 80a, each of which comprises inner and outer sections 114 and 116, respectively. The inner portions 114 of the grooves 80a extend radially outwardly and downwardly from a central bore 82a and terminate at their lower ends in the radially outwardly extending sections 116 which are formed along the bottom or lower side of the seat member 60a. It will be seen that upon assembly of the joint construction 10a, an annular chamber 118 is defined between the bottom of the seat member 60a and the top of the seat member 62a, which annulus is communicable with the groove sections 116 and is adapted to receive a supply of lubricant therefrom when the grooves 80a are filled with lubricant through the opening 92a in which the grease plug 94a is mounted.

The upper seat member 60a also differs slightly from its analogous member 60 of the joint construction 10 due to the configuration of the annular ramp portion 78a which projects upwardly from the top of the seat member 60a. In particular, the ramp portion 78a comprises substantially parallel radially inner and outer side walls 119 and 120 which terminate in a semicircular upper surface 122. It will be seen that upon assembly of the upper seat member 60a within the cavity 22a, the force exerted by the seat member 60a upon the top of the head section 40a of the stud member 30a due to the compressed ramp portion 78a will be concentrated to a relatively small annular area, i.e., that area of the seat member 60a which bears directly upon the shoulder 50a of the stud member 38a. Accordingly, the joint construction 10a will resist angular movement of the stud member 38a to a somewhat greater degree than similar movement of the stud member 38 is resisted in the joint construction 10.

The joint construction 10a is provided with a dust shield 84a which differs slightly from the shield 84 of the joint 10 in that the shield 84a is disc-shaped instead of cup-shaped as is the aforedescribed shield 84.

It will be seen from the foregoing that the present invention provides a novel joint construction which, through the provision of a novel wear compensating and load applying feature (i.e., the provision of the compressible ramp portions 78 and 78a on the seat members 60 and 60a, respectively), will exhibit very desirable shock absorbing, vibration, damping and torque resisting characteristics, along with excellent resistance to stud deflection, and hence will have a long and effective operational life.

While it will be apparent that the embodiments herein illustrated are well calculated to fulfill the objects above stated, it will be appreciated that the present invention is susceptible to modification, variation and change without departing from the proper scope or fair meaning of the subjoined claims.

What is claimed is:

1. In a flexible joint construction,
   a housing defining a central cavity and having an open end at one end of said cavity,
   a stud member extending through said opening and having a head section disposed within said cavity,
   said head section comprising a frusto-conical portion and a hemispherical portion which define a radial shoulder portion therebetween,
   first and second seat members disposed within said cavity for supporting said head section of said stud member,
   one of said seat members being engaged with said shoulder portion and said hemispherical portion of said head section for limiting axial and angular movement of said stud member relative to said housing,
   closure means closing one end of said housing, and
   a generally axially extending resilient embossed portion on one of said seat members interposed between the main body of one of said seat members and said closure means, said portion being substantially axially aligned with said shoulder portion of said head section and being compressible upon assembly of the joint construction whereby to urge said one seat member into engagement with said shoulder portion.

2. In a flexible joint construction,
   a housing forming a cavity and having an opening at one end of said housing,
   a stud member extending through said opening and having a head section disposed within said cavity,
   said head section being formed with a frusto-conical portion and hemispherical portion which define a radial shoulder portion therebetween,
   a first seat member disposed within said cavity and engageable with said frusto-conical portion of said head section,
   a second seat member disposed within said cavity and engageable with said hemispherical portion and said shoulder portion of said head section,
   said second seat member including an axially extending embossed portion, and
   a closure member closing one end of said cavity and maintaining said portion in a state of compression to urge said second seat member into engagement with said head section to resist axial and angular movement of said stud member relative to said housing.

3. The invention as set forth in claim 2 wherein one of said seat members is formed with a plurality of grooves which are adapted to retain lubricant adjacent said head section of said stud member.

4. The invention as set forth in claim 2 wherein one of said seat members is formed with a radially extending slit to accommodate for slight dimensional variations in the size of said cavity.

5. In a flexible joint construction,
   a housing defining a tapered cavity and having first and second openings at the opposite ends thereof,
   a stud member extending through said first opening and having a head section disposed within said cavity,
   said head section being formed with a frusto-conical lower portion and hemispherical upper portion,
   a first annular seat member having an outer surface adapted to contiguously engage the inner periphery of said cavity and an inner surface engageable with said frusto-conical portion of said head section,
   a second seat member having an outer surface adapted to contiguously engage the inner periphery of said cavity,
   said second seat member further including a hemispherical recessed portion complementary to and engageable with said hemispherical portion of said head section,
   an axially extending ramp integrally formed on the upper end of said second seat member, and
   a closure member rigidly secured to said housing at a position compressing said ramp whereby to urge said second seat member into engagement with said head section to resist axial, angular and rotative movement of said stud member relative to said housing.

6. The invention as set forth in claim 5 wherein said first and second seat members define an annular lubricant retaining recess therebetween.

7. The invention as set forth in claim 5 wherein said frusto-conical and hemispherical portions of said head section define a radially outwardly extending shoulder and wherein said ramp is formed on said second seat member in substantial axial alignment with said shoulder.

8. The invention as set forth in claim 5 wherein said ramp defines a shallow concave recess in substantial axial alignment with said hemispherical portion of said head section.

9. The invention as set forth in claim 6 wherein said second seat member is formed with a pluarlity of radially extending lubricant retaining grooves communicable with said annular recess.

10. The invention as set forth in claim 7 wherein the lower end of said second seat member bears upon the upper end of said first seat member and said shoulder.

11. In a flexible joint construction,
    a housing defining a frusto-conical shaped cavity,
    a radially inwardly extending flange section formed at the lower end of said housing and defining a central opening coaxially aligned with said cavity,
    a retaining lip section formed around the upper end of said housing circumjacent the top of said cavity,
    an elongated cylindrical stud member extending through said opening and comprising a head section disposed within said cavity,
    said head section comprising a frusto-conical portion and a hemispherical portion which define a radially outwardly extending shoulder therebetween, a first seat member supported within said cavity upon said flange and comprising frusto-conical inner and outer surfaces adapted to contiguously engage the side wall of said cavity and the outer periphery of said frusto-conical portion of said head section, a second seat member disposed within said cavity and comprising a frusto-conical exterior surface and a hemispherical shaped central recess adapted to contiguously engage the inner wall of said cavity and said hemispherical portion of said stud section, said second seat member being supported at its lower end upon the top of said first seat member and said shoulder, a plurality of lubricant retaining grooves formed in said hemispherical recessed portion, said second seat member comprising an annular upwardly projecting ramp portion arranged substantially above said shoulder of said head section, and a flat annular closure member rigidly secured to said housing by said retaining lip section at a position tightly compressing said ramp portion of said second seat member, whereby said second seat member is urged downwardly toward said head section to resist axial, angular and rotative movement of said stud member relative to said housing.

12. The invention as set forth in claim 11 wherein the radially inner side of said ramp portion defines a gradual slope portion which substantially overlies said hemispherical portion of said stud member.

13. The invention as set forth in claim 11 wherein the lower end of said upper seat member partially defines an annulus around said head section and communicable with said lubricant retaining grooves.

References Cited

UNITED STATES PATENTS

| | | | |
|---|---|---|---|
| 2,778,664 | 11/1957 | Herbenar | 287—85 |
| 2,838,330 | 6/1958 | Fidler | 287—90 |
| 2,846,251 | 8/1958 | Herbenar | 287—85 |
| 3,180,655 | 4/1965 | Gerner | 287—93 X |
| 3,275,338 | 9/1966 | Herbenar et al. | 280—951 |

FOREIGN PATENTS

| | | |
|---|---|---|
| 1,051,638 | 9/1953 | France. |
| 1,323,319 | 2/1963 | France. |
| 602,081 | 5/1948 | Great Britain. |
| 819,733 | 9/1959 | Great Britain. |

CARL W. TOMLIN, *Primary Examiner.*

A. V. KUNDRAT, *Assistant Examiner.*